(12) United States Patent
Okano et al.

(10) Patent No.: US 11,932,218 B2
(45) Date of Patent: Mar. 19, 2024

(54) VEHICLE BRAKE SYSTEM

(71) Applicants: TOYOTA JIDOSHA KABUSHIKI KAISHA, Toyota (JP); ADVICS CO., LTD., Kariya (JP)

(72) Inventors: Takahiro Okano, Chiryu (JP); Yusuke Kamiya, Toyota (JP); Tatsushi Kobayashi, Kariya (JP); Shimpei Kodani, Kariya (JP)

(73) Assignees: TOYOTA JIDOSHA KABUSHIKI KAISHA, Toyota (JP); ADVICS CO., LTD., Kariya (JP)

( * ) Notice: Subject to any disclaimer, the term of this patent is extended or adjusted under 35 U.S.C. 154(b) by 198 days.

(21) Appl. No.: 17/645,365

(22) Filed: Dec. 21, 2021

(65) Prior Publication Data
US 2022/0194351 A1    Jun. 23, 2022

(30) Foreign Application Priority Data
Dec. 23, 2020  (JP) .................................. 2020-214061

(51) Int. Cl.
*B60T 17/22* (2006.01)
*B60T 7/04* (2006.01)
(Continued)

(52) U.S. Cl.
CPC ............ *B60T 17/221* (2013.01); *B60T 7/042* (2013.01); *B60T 8/171* (2013.01); *B60T 8/172* (2013.01);
(Continued)

(58) Field of Classification Search
CPC ........ B60T 17/221; B60T 7/042; B60T 8/171; B60T 8/172; B60T 8/4077; B60T 8/885; B60T 8/94; B60T 8/96; B60T 13/146; B60T 13/662; B60T 2220/04; B60T 2270/413; B60T 2270/604; B60T 1/10; B60T 13/588; B60T 13/686; B60T 17/22; B60T 2270/406; B60T 8/17; F16D 61/00
See application file for complete search history.

(56) References Cited

U.S. PATENT DOCUMENTS

2018/0244253 A1*  8/2018  Kobayashi ................ B60T 8/96
2020/0381936 A1* 12/2020  Sato ........................ H02M 1/32

FOREIGN PATENT DOCUMENTS

JP           2017-043283 A       3/2017

* cited by examiner

*Primary Examiner* — Joseph J Dallo
(74) *Attorney, Agent, or Firm* — Sughrue Mion, PLLC

(57) ABSTRACT

A vehicle brake system, including: a first-braking-force control mechanism configured to control a first braking force, a second-braking-force control mechanism configured to control a second braking force, an abnormal-state detecting device configured to detect whether the first-braking-force control mechanism is in an abnormal state, a pseudo-abnormal-state detecting device configured to detect whether the first-braking-force control mechanism is in a pseudo abnormal state in which the first-braking-force control mechanism is suspected to be in the abnormal state, and a controller including a pseudo abnormal state controller configured to control the second-braking-force control mechanism in an operating state of the first-braking-force control mechanism so as to control the second braking force when the pseudo-abnormal-state detecting device detects that the first-braking-force control mechanism is in the pseudo abnormal state.

5 Claims, 9 Drawing Sheets

(51) Int. Cl.
*B60T 8/171* (2006.01)
*B60T 8/172* (2006.01)
*B60T 8/40* (2006.01)
*B60T 8/88* (2006.01)
*B60T 8/94* (2006.01)
*B60T 8/96* (2006.01)
*B60T 13/14* (2006.01)
*B60T 13/66* (2006.01)

(52) U.S. Cl.
CPC ............ *B60T 8/4077* (2013.01); *B60T 8/885* (2013.01); *B60T 8/94* (2013.01); *B60T 8/96* (2013.01); *B60T 13/146* (2013.01); *B60T 13/662* (2013.01); *B60T 2220/04* (2013.01); *B60T 2270/413* (2013.01)

VEHICLE BRAKE SYSTEM

CROSS REFERENCE TO RELATED APPLICATION

The present application claims priority to Japanese Patent Application No. 2020-214061, which was filed on Dec. 23, 2020, the disclosure of which is herein incorporated by reference in its entirety.

BACKGROUND

Technical Field

The following disclosure relates to a brake system for a vehicle configured to apply a braking force to the vehicle.

Description of Related Art

Patent Document 1 (Japanese Patent Application Publication No. 2017-043283) discloses a hydraulic brake system configured to detect an abnormality when a deviation amount of an actual hydraulic pressure with respect to a target hydraulic pressure is not smaller than a set amount. In the disclosed hydraulic brake system, the set amount is large when the target hydraulic pressure is in a changing state while the set amount is gradually decreased when the target hydraulic pressure is in a non-changing state. The disclosed system enables appropriate detection of the presence or absence of the abnormality even in a case where the temperature of a working fluid is low.

SUMMARY

An aspect of the present disclosure is directed to a vehicle brake system which prevents or reduces a shortage of a braking force in a time period from a time point of starting detection of the presence or absence of an abnormality to a time point of determining the presence or absence of an abnormality.

In the vehicle brake system according to the present disclosure, a braking force is applied by a second-braking-force control mechanism when it is detected that a first-braking-force control mechanism is in a pseudo abnormal state in which the first-braking-force control mechanism is suspected to be abnormal. The present brake system is less likely to suffer from a shortage of a braking force, as compared with an arrangement in which a braking force is applied by the second-braking-force control mechanism when it is detected that the first-braking-force control mechanism is in an abnormal state.

BRIEF DESCRIPTION OF THE DRAWINGS

The objects, features, advantages, and technical and industrial significance of the present disclosure will be better understood by reading the following detailed description of an embodiment, when considered in connection with the accompanying drawings, in which.

DETAILED DESCRIPTION OF THE EMBODIMENT

Figure 1:
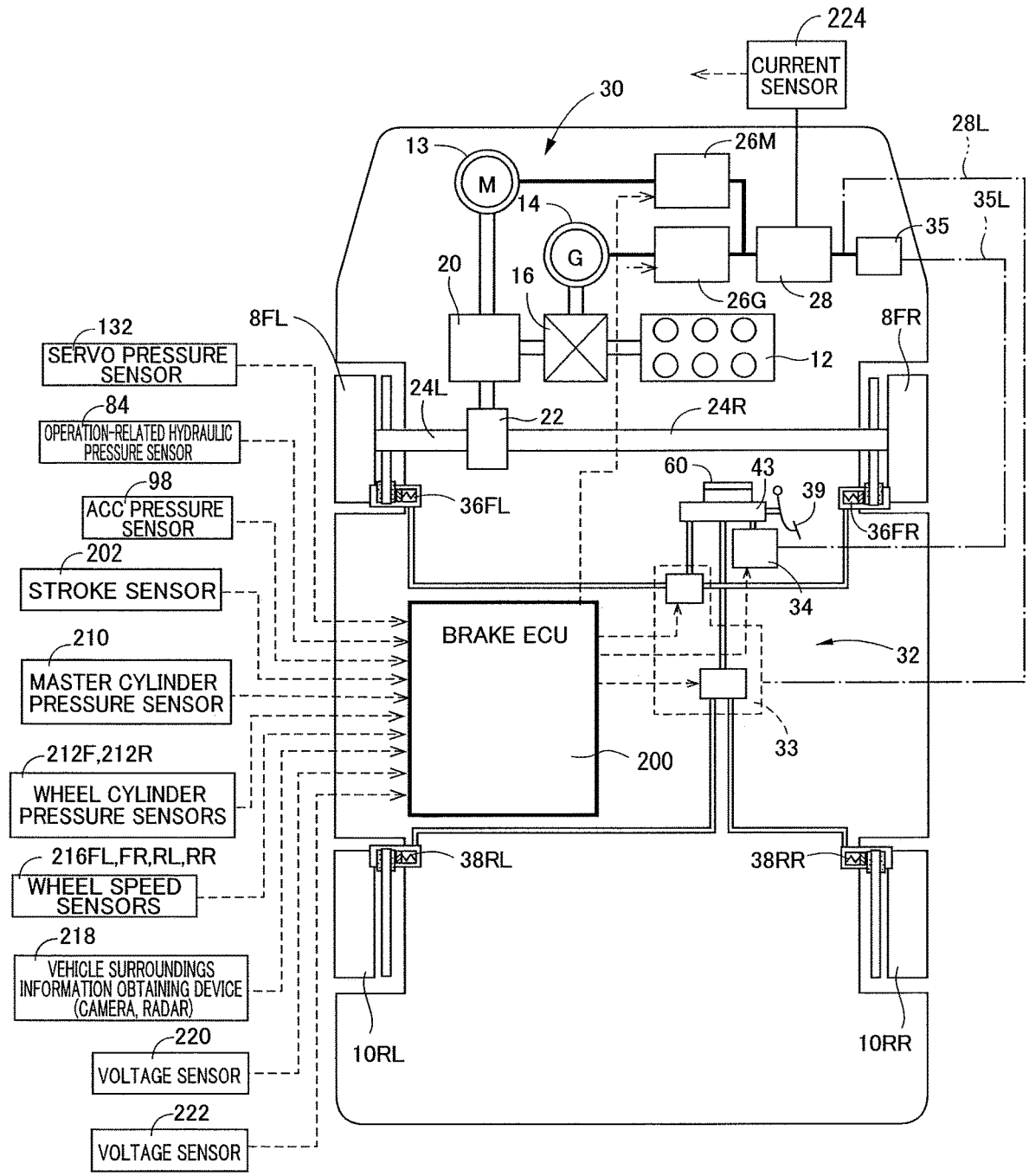
FIG. 1 is a conceptual view of a vehicle brake system according to one embodiment of the present disclosure.

Referring to the drawings, there will be hereinafter described a vehicle brake system according to one embodiment of the present disclosure. The present brake system is installed on a vehicle whose drive source includes an electric motor and whose driving state is switchable between a manual driving state and an automated driving state. The present brake system may be installed on other vehicles.

FIG. 1 schematically illustrates one example of a vehicle on which is installed a brake system according to one embodiment of the present disclosure. The vehicle is a Hybrid Electric Vehicle (HEV) including front left and right wheels 8FL, 8FR and rear left and right wheels 10RL, 10RR. The front left and right wheels 8FL, 8FR are drive wheels. A drive system of the vehicle includes an engine 12 and an electric motor 13 each as a drive source, a generator 14 functioning mainly as an electric generator, and a power distribution mechanism 16, for instance.

The power distribution mechanism 16 is configured to distribute rotation of the engine 12 to rotation of the generator 14 and rotation of an output shaft of the power distribution mechanism 16. A reduction mechanism 20 functioning as a speed reducer is connected to the output shaft of the power distribution mechanism 16. The electric motor 13 is connected to the reduction mechanism 20. An output shaft of the reduction mechanism 20 is connected to the front left and right wheels 8FL, 8FR via a differential device 22 and respective drive shafts 24L, 24R. The front left and right wheels 8FL, 8FR are driven and rotated by at least one of the engine 12 and the electric motor 13. The generator 14 and the electric motor 13 are connected to a main battery 28 via inverters 26G, 26M, respectively. The main battery 28 as a power source supplies electric energy to the electric motor 13, etc., and stores electric energy obtained by the electric motor 13 and the generator 14. The generator 14 and the electric motor 13 are controlled by controlling the inverters 26M, 26G, respectively.

The brake system according to the present embodiment includes (i) a regenerative brake mechanism 30 configured to apply a regenerative braking force to the front left and right wheels 8FL, 8FR each as the drive wheel and (ii) a hydraulic brake mechanism 32 configured to apply a hydraulic braking force as a friction braking force to the four wheels, i.e., the front left and right wheels 8FL, 8FR and the rear left and right wheels 10RL, 10RR. The hydraulic brake mechanism 32 includes (a) a downstream hydraulic-pressure control mechanism 33 as a first-braking-force control mechanism and a first-hydraulic-pressure control mechanism, (b) an upstream hydraulic-pressure control mechanism 34 as a second-braking-force control mechanism and a second-hydraulic-pressure control mechanism, (c) hydraulic brakes (37FL, 37FR), each as a friction brake, respectively provided for the front left and right wheels 8FL, 8FR and respectively including wheel cylinders 36FL, 36FR, and (d) hydraulic brakes (31RL, 31RR), each as a friction brake, respectively provided for the rear left and right wheels 10RL, 10RR and respectively including wheel cylinders 38RL, 38RR.

The regenerative brake mechanism 30 includes the electric motor 13, the inverter 26M, the main battery 28, etc. The regenerative brake mechanism 30 is configured to apply a regenerative braking force to the front left and right wheels 8FL, 8FR by regenerative braking of the electric motor 13 and to control the regenerative braking force. Electric energy generated by regenerative braking of the electric motor 13 is supplied to the main battery 28 via the inverter 26M so as to be stored in the main battery 28. The electric motor 13 is controlled by controlling the inverter 26M, and the regenerative braking force to be applied to the front left and right wheels 8FL, 8FR is controlled.

In the following description, components, such as the wheel cylinders, will be referred to without suffixes such as FL, FR, RL, RR, F, R indicative of the corresponding wheel positions where it is not necessary to distinguish the components by their wheel positions.

Electric power stored in the main battery 28 is supplied to and stored in a sub battery 35 (as a power source) with its voltage stepped down. The electric power whose voltage is stepped down is supplied to the downstream hydraulic-pressure control mechanism 33 via a power supply line 28L. Electric power in the sub battery 35 is supplied to the upstream hydraulic-pressure control mechanism 34 via a power supply line 35L. Thus, the upstream hydraulic-pressure control mechanism 34 and the downstream hydraulic-pressure control mechanism 33 in the present embodiment respectively receive the electric power supplied from the mutually different power sources 28, 35.

Figure 2:
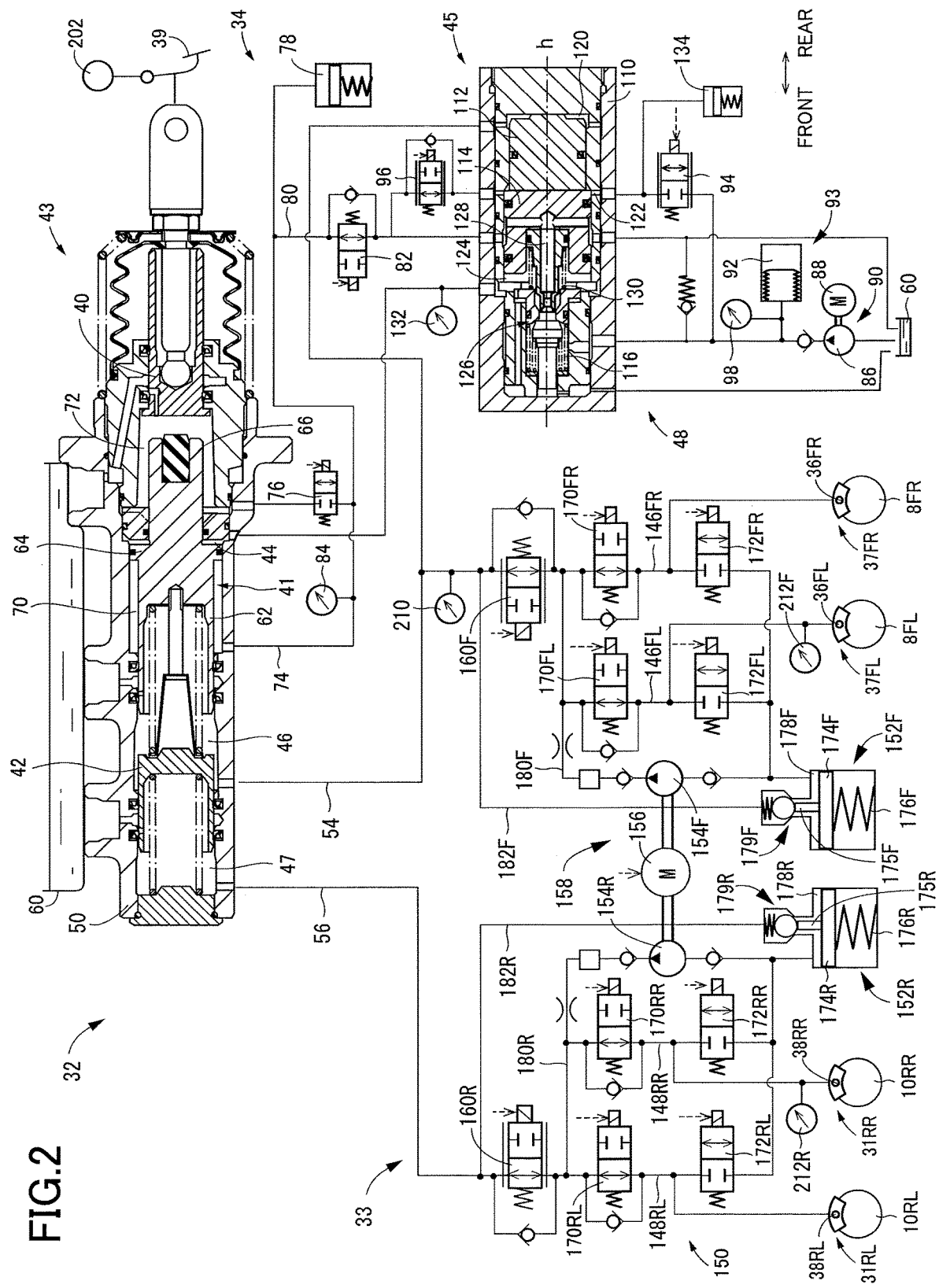
FIG. 2 is a circuit diagram of a hydraulic brake mechanism of the brake system.

As illustrated in FIG. 2, the upstream hydraulic-pressure control mechanism 34 includes (a) a master cylinder 43 including: an input piston 40 coupled to a brake pedal 39 as a brake operating member operable by a driver and two pressurizing pistons 41, 42 and (b) a rear-hydraulic-pressure control device 48 including a regulator 45 connected to a rear chamber 44 provided rearward of the pressurizing piston 41 of the master cylinder 43. The rear-hydraulic-pressure control device 48 controls a hydraulic pressure in the rear chamber 44 to thereby control a hydraulic pressure in the pressurizing chambers 46, 47 respectively located frontward of the corresponding pressurizing pistons 41, 42.

The pressurizing pistons 41, 42 and the input piston 40 are fluid-tightly and slidably disposed in a housing 50 of the master cylinder 43 so as to be arranged in series with one another. The wheel cylinders 36 of the hydraulic brakes 37 provided for the front left and right wheels 8 are connected to the pressurizing chamber 46 via a fluid passage 54 while the wheel cylinders 38 of the hydraulic brakes 31 provided for the rear left and right wheels 10 are connected to the pressurizing chamber 47 via a fluid passage 56. The pressurizing pistons 41, 42 are urged in a backward direction by respective return springs. When the pressurizing pistons 41, 42 are located at respective back end positions, the pressurizing chambers 46, 47 are in communication with a master reservoir 60.

The pressurizing piston 41 of the master cylinder 43 has a generally stepped shape. The pressurizing piston 41 includes (a) a front piston portion 62 located at a front portion of the pressurizing piston 41, (b) an intermediate piston portion 64 located at an intermediate portion of the pressurizing piston 41 so as to radially protrude, and (c) a rear small-diameter portion 66 located at a rear portion of the pressurizing piston 41 and having a diameter smaller than a diameter of the intermediate piston portion 64. The front piston portion 62, the intermediate piston portion 64, and the rear small-diameter portion 66 are fluid-tightly and slidably disposed in the housing 50. A space in front of the front piston portion 62 is the pressurizing chamber 46, and a space in front of the intermediate piston portion 64 is an annular chamber 70. A chamber located at a rear of the intermediate piston portion 64 and defined by the housing 50, the rear small-diameter portion 66, and the intermediate piston portion 64 is the rear chamber 44.

The input piston 40 is located rearward of the pressurizing piston 41, and a separated chamber 72 is defined between the rear small-diameter portion 66 and the input piston 40. The brake pedal 39 is linked to a rear portion of the input piston 40 via an operating rod (hereinafter simply referred to as "rod" where appropriate) and other components.

The annular chamber 70 and the separated chamber 72 are connected to each other via a connecting passage 74. A communication control valve 76 is provided in the connecting passage 74. The communication control valve 76 is a normally-closed electromagnetic open/close valve. The communication control valve 76 is placed in an open state when the brake pedal 39 is operated or when a main switch of the vehicle is turned to ON, for instance. Thus, the communication control valve 76 is basically in the open state. A portion of the connecting passage 74 located on one of opposite sides of the communication control valve 76 that is closer to the annular chamber 70 is connected to a stroke simulator 78 and is connected to the master reservoir 60 via a reservoir passage 80. A reservoir cut-off valve 82, which is a normally-open electromagnetic open/close valve, is provided in the reservoir passage 80.

A hydraulic pressure sensor 84 is provided at the above-indicated portion of the connecting passage 74 located on the one of opposite sides of the communication control valve 76 that is closer to the annular chamber 70. The hydraulic pressure sensor 84 detects a hydraulic pressure in the annular chamber 70 and the separated chamber 72 in a state in which the annular chamber 70 and the separated chamber 72 are in communication with each other and are isolated from the master reservoir 60. The hydraulic pressure level in the annular chamber 70 and the separated chamber 72 corresponds to a magnitude of an operation force of the brake pedal 39. In this sense, the hydraulic pressure sensor 84 will be hereinafter referred to as an "operation-related hydraulic pressure sensor".

The rear-hydraulic-pressure control device 48 includes a high pressure source 93, a hydraulic-pressure control valve device, etc., in addition to the regulator 45. The high pressure source 93 includes: a pump device 90 including a pump 86 and a pump motor 88; and an accumulator 92, for instance. The hydraulic-pressure control valve device controls a hydraulic pressure in a control chamber 122 that will be explained. The hydraulic-pressure control valve device includes a pressure-increase control valve 94, a pressure-decrease control valve 96, etc.

The accumulator 92 accumulates, in a pressurized state, a working fluid ejected from the pump device 90. An accumulator pressure that is a hydraulic pressure of the working fluid accumulated in the accumulator 92 is detected by an accumulator pressure sensor 98. The pump motor 88 is controlled such that the accumulator pressure detected by the accumulator pressure sensor 98 is kept within a predetermined range.

The regulator 45 includes (d) a housing 110 and (e) a pilot piston 112 and a control piston 114 disposed in the housing 110 so as to be arranged in series in a direction parallel to an axis h. A high-pressure chamber 116 is formed in the housing 110 at a position in front of the control piston 114. The high-pressure chamber 116 is connected to the high pressure source 93. A space between the pilot piston 112 and the housing 110 is a pilot pressure chamber 120. A space at a rear of the control piston 114 is the control chamber 122. A space in front of the control piston 114 is a servo chamber 124 as an output chamber. A high-pressure supply valve 126 is provided between the servo chamber 124 and the high-pressure chamber 116. The high-pressure supply valve 126 is a normally-closed valve that isolates the servo chamber 124 and the high-pressure chamber 116 from each other in a non-operating state of the regulator 45. The control piston 114 is urged in the backward direction by a return spring 130.

A low-pressure passage 128 is formed in the control piston 114 so as to communicate with the master reservoir 60 all the time. The low-pressure passage 128 is open in a front end of the control piston 114. The opening is opposed to the high-pressure supply valve 126. Thus, when the control piston 114 is located at its back end position, the servo chamber 124 is isolated from the high-pressure chamber 116 and communicates with the master reservoir 60 via the low-pressure passage 128. When the control piston 114 is moved forward and the opening of the low-pressure passage 128 is accordingly closed, the servo chamber 124 is isolated from the master reservoir 60, and the high-pressure supply valve 126 is opened so that the servo chamber 124 is brought into communication with the high-pressure chamber 116.

The pressurizing chamber 46 is connected to the pilot pressure chamber 120. The pilot pressure chamber 120 and the pressurizing chamber 46 are held in communication with each other all the time. Thus, the hydraulic pressure in the pressurizing chamber 46 acts on the pilot piston 112 all the time.

The rear chamber 44 is connected to the servo chamber 124. The servo chamber 124 and the rear chamber 44 are held in communication with each other all the time. Thus, a servo pressure Ps, which is a hydraulic pressure in the servo chamber 124, is basically equal to the hydraulic pressure in the rear chamber 44. The servo pressure Ps is detected by a servo pressure sensor 132.

The pressure-increase control valve (SLA) 94 and the pressure-decrease control valve (SLR) 96 are connected to the control chamber 122. The pressure-increase control valve 94 is provided between the control chamber 122 and the high pressure source 93, and the pressure-decrease control valve 96 is provided between the control chamber 122 and the master reservoir 60. Electric currents supplied to coils of the pressure-increase control valve 94 and the pressure-decrease control valve 96 are controlled to control the hydraulic pressure in the control chamber 122. (Each of these currents will be hereinafter referred to as a "supply current" where appropriate. The same applies to other electromagnetic valves.) A damper 134 is connected to the control chamber 122, and the working fluid flows between the control chamber 122 and the damper 134.

In the present embodiment, a relationship between the hydraulic pressure of the control chamber 122 and the servo pressure Ps of the servo chamber 124 in the regulator 45 and a relationship between the hydraulic pressure of the rear chamber 44 and the hydraulic pressure of the pressurizing chambers 46, 47 in the master cylinder 43 are determined based on the configurations of the regulator 45 and the master cylinder 43. Accordingly, the hydraulic pressure of the control chamber 122 is controlled such that the hydraulic pressure of the pressurizing chambers 46, 47 becomes close to a target hydraulic pressure.

The downstream hydraulic-pressure control mechanism 33 includes, for instance, (a) a slip control valve device 150, (b) a pump device 158 including: pumps 154F, 154R configured to pump up the working fluid in pressure-reduction reservoirs 152F, 152R to eject the working fluid toward an upstream side of the slip control valve device 150; and a pump motor 156, and (c) normally-open hydraulic pressure control valves 160F, 160R disposed between the pumps 154F, 154R and the pressurizing chambers 46, 47 of the master cylinder 43. The hydraulic pressure control valves 160F, 160R control a pressure difference between the hydraulic pressure in the pressurizing chambers 46, 47 of the master cylinder 43 and a hydraulic pressure in the wheel cylinders 36FR, 36FL, 38RR, 38RL of the hydraulic brakes 37FL, 37FR, 31RL, 31RR.

The downstream hydraulic-pressure control mechanism 33 has front and rear lines. In the front-wheel-side line, there are connected, to the fluid passage 54, individual passages 146FL, 146FR that are connected respectively to the wheel cylinders 36FL, 36FR of the front left and right wheels 8FL, 8FR. Pressure-hold valves 170FL, 170FR are provided respectively in the individual passages 146FR, 146FL. The wheel cylinders 36FL, 36FR are connected to a fluid chamber 178F of the pressure-reduction reservoir 152F via corresponding pressure reduction passages in which pressure-reduction valves 172FL, 172FR are respectively provided.

In the rear-wheel-side line, there are connected, to the fluid passage 56, individual passages 148RL, 148RR that are connected respectively to the wheel cylinders 38RL, 38RR of the rear left and right wheels 10RL, 10RR. Pressure-hold valves 170RL, 170RR are provided respectively in the individual passages 148RL, 148RR. A pressure-reduction valve 172RL is provided between the wheel cylinder 38RL and a fluid chamber 178R of the pressure-reduction reservoir 152R, and a pressure-reduction valve 172RR is provided between the wheel cylinder 38RR and the fluid chamber 178R of the pressure-reduction reservoir 152R. The pressure-hold valves 170, the pressure-reduction valves 172, the pressure-reduction reservoirs 152, etc., constitute the slip control valve device 150.

Hereinafter, the front-wheel-side line will be explained, and an explanation of the rear-wheel-side is dispensed with.

The pressure-reduction reservoir 152F includes a housing, a partition member 174F slidably disposed in the housing, and an elastic member 176F provided on one of opposite sides of the partition member 174F in the housing. A space in the housing located on the other of the opposite sides of the partition member 174F that is remote from the elastic member 176F is the fluid chamber 178F in which the working fluid is stored.

A replenishment valve 179F is provided in the fluid chamber 178F. The replenishment valve 179F includes a valve seat, a valve member, a replenishment-valve spring for applying an elastic force in a direction in which the valve member is pushed onto the valve seat, and a valve opening member 175F provided on the partition member 174F. In a case where the amount of the working fluid stored in the fluid chamber 178F of the pressure-reduction reservoir 152F is not smaller than a set amount, the valve member is seated on the valve seat, and the replenishment valve 179F is in a closed state. When the amount of the working fluid in the fluid chamber 178F becomes smaller than the set amount, the partition member 174F is moved by the elastic force of the elastic member 176F and the valve opening member 175F causes the valve member to be separated away from the valve seat against the elastic force of the replenishment-valve spring, so that the replenishment valve 179F is placed in an open state.

The fluid chamber 178F of the pressure-reduction reservoir 152F and a portion of the fluid passage 54 located upstream of positions at which the individual passages 146FL, 146FR are respectively connected (i.e., a portion of the fluid passage 54 located upstream of the pressure-hold valves 170FL, 170FR) are connected via a pump passage 180F in which the pump 154F is provided. In a portion of the pump passage 180F located on the ejection side of the pump 154F, a damper, a restrictor, etc., are provided for preventing or reducing pulsation of the working fluid ejected from the pump 154F. The suction side of the pump 154F is connected to the fluid chamber 178F of the pressure-reduction reservoir 152F via a suction valve.

The hydraulic pressure control valve 160F is provided in a portion of the fluid passage 54 located upstream of a position at which the pump passage 180F is connected. A portion of the fluid passage 54 located upstream of the hydraulic pressure control valve 160F and the pressure-reduction reservoir 152F are connected to each other by a replenishment passage 182F via the replenishment valve 179F.

The hydraulic pressure control valve 160F is configured to control a difference dP in a hydraulic pressure between an upstream side and a downstream side of the hydraulic pressure control valve 160F to a pressure level corresponding to a supply current to the hydraulic pressure control valve 160F. The pressure difference dP increases with an increase in the supply current to the hydraulic pressure control valve 160F, and the hydraulic pressure in the wheel cylinders 36 increases with respect to the hydraulic pressure in the pressurizing chamber 46 of the master cylinder 43.

As illustrated in FIG. 1, the vehicle brake system includes a brake ECU 200 as a controller constituted principally by a computer. The brake ECU 200 includes an executing device, a memory, an input/output device (all of which are not illustrated). There are connected, to the input/output device, a stroke sensor 202, the operation-related hydraulic pressure sensor 84, the accumulator pressure (Acc pressure) sensor 98, the servo pressure sensor 132, a master cylinder pressure sensor 210, wheel cylinder pressure sensors 212F, 212R, wheel speed sensors 216, a vehicle surroundings information obtaining device 218, voltage sensors 220, 222, a current sensor 224, etc. Further, the pressure-increase control valve 94, the pressure-decrease control valve 96, the communication control valve 76, the reservoir cut-off valve 82, the slip control valve device 150, the pump motor 156, the hydraulic pressure control valves 160, etc., are connected to the input/output device via respective drive circuits (not illustrated).

The stroke sensor 202 is configured to detect a stroke of the brake pedal 39. The stroke of the brake pedal 39 is equivalent to an amount of a movement of the brake pedal 39. The wheel speed sensors 216 are provided for the respective wheels 8, 10 to detect rotational speeds of the corresponding wheels 8, 10. A running speed of the vehicle is obtained based on detection values of the wheel speed sensors 216. The vehicle surroundings information obtaining device 218 includes a camera, a radar, etc., and is configured to obtain an object present in the surroundings of the vehicle, a lane line, etc., based on information obtained by the camera, the radar, etc. The voltage sensor 220 detects a voltage of the main battery 28 or a voltage applied to the pump motor 156 while the voltage sensor 222 detects a voltage of the sub battery 35 or a voltage applied to the pump motor 88. The master cylinder pressure sensor 210 is provided in the fluid passage 54 to detect the hydraulic pressure in the pressurizing chamber 46. The hydraulic pressure in the pressurizing chamber 46 and the hydraulic pressure in the pressurizing chamber 47 are estimated to be substantially the same. Thus, the hydraulic pressure in the pressurizing chamber 47 can be estimated based on the detection value of the master cylinder pressure sensor 210. The wheel cylinder pressure sensors 212F, 212R respectively detect the hydraulic pressures in the respective wheel cylinders 36FL, 38RR. On the front-wheel side, the hydraulic pressures in the wheel cylinders 36FR, 36FL are substantially the same. On the rear-wheel side, the hydraulic pressures in the wheel cylinders 38RL, 38RR are substantially the same. Thus, by detecting the hydraulic pressure in one of the two wheel cylinders, the hydraulic pressure in the other of the two wheel cylinders can be estimated.

The current sensor 224 is provided for the main battery 28. Based on the detection value of the current sensor 224, a remaining storable capacity of the main battery 28 is obtained.

There will be next explained operations of the vehicle brake system configured as described above.

In the vehicle brake system, the presence or absence of a braking request is determined based on at least one of the operation state of the brake pedal 39 and the vehicle surroundings information obtained by the vehicle surroundings information obtaining device 218. The operation state of the brake pedal 39 is obtained based on at least one of the detection value of the stroke sensor 202 and the detection value of the operation-related hydraulic pressure sensor 84.

In the manual driving state, the presence or absence of the braking request is determined based on at least one of the operation state of the brake pedal 39 and the vehicle surroundings information obtained by the vehicle surroundings information obtaining device 218. In the automated driving state, the presence or absence of the braking request is determined based on the information obtained by the vehicle surroundings information obtaining device 218.

When it is determined that the braking request is present, a target braking force Ft is obtained based on at least one of the vehicle surroundings information and the operation state of the brake pedal 39, for instance. A regenerative cooperative control of the regenerative braking force and the hydraulic braking force is executed such that the target braking force Ft is obtained. (The hydraulic braking force refers to a braking force applied to the vehicle based on the hydraulic pressure in the wheel cylinders 36, 38.)

In the regenerative cooperative control, the regenerative braking force that can be output by the regenerative brake mechanism 30 is obtained based on the running speed of the vehicle and the remaining storable capacity of the main battery 28, for instance. A target regenerative braking force Fte is obtained based on the outputtable regenerative braking force and the target braking force Ft, for instance. A target hydraulic braking force Ftp is obtained based on a value obtained by subtracting the target regenerative braking force Fte from the target braking force Ft.

Figure 5:
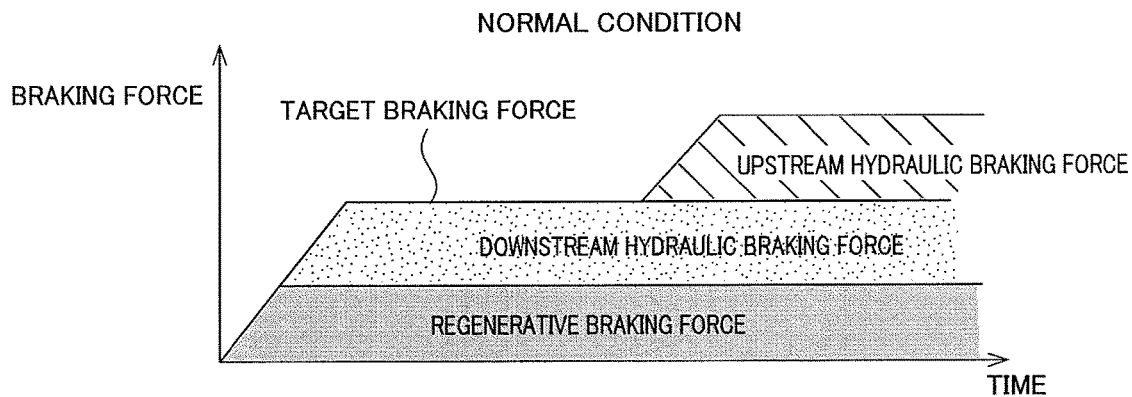
FIG. 5 is a conceptual view illustrating a state of a regenerative cooperative control executed when the brake system is normal.

In a case where the target braking force Ft is less than a set value, the target hydraulic braking force Ftp is determined to be a target downstream hydraulic braking force Ftd, and a target upstream hydraulic braking force Ftu is determined to be 0, as illustrated in FIG. 5. The regenerative cooperative control of the regenerative braking force and a downstream hydraulic braking force is executed.

$$Ftp=Ft-Fte\ Ftd=Ftp\ Ftu=0$$

In a case where the target braking force Ft is not less than the set value, the target upstream hydraulic braking force Ftu and the target downstream hydraulic braking force Ftd are determined such that the target hydraulic braking force Ftp is attained by an actual upstream hydraulic braking force and an actual downstream hydraulic braking force. The regenerative cooperative control of the regenerative braking force, the downstream hydraulic braking force, and an upstream hydraulic braking force is executed.

$$Ftp=Ftu+Ftd$$

The regulator 45 in the upstream hydraulic-pressure control mechanism 34 is operated, the hydraulic pressure in the rear chamber 44 is controlled, and the hydraulic pressure in the pressurizing chambers 46, 47 is controlled.

In the rear-hydraulic-pressure control device 48, the hydraulic pressure in the control chamber 122 is controlled by controlling the pressure-increase control valve 94 and the pressure-decrease control valve 96. The control piston 114 is moved forward, and the servo pressure is generated in the servo chamber 124. The generated servo pressure is supplied to the rear chamber 44. The pressurizing piston 41 is moved forward by the hydraulic pressure in the rear chamber 44, and the pressurizing piston 42 is moved forward. Thus, the hydraulic pressure is generated in the pressurizing chambers 46, 47.

In the present embodiment, a braking force based on the hydraulic pressure in the pressurizing chambers 46, 47 is referred to as the upstream hydraulic braking force. In other words, assuming that the hydraulic pressure in the pressurizing chambers 46, 47 is supplied to the wheel cylinders 36, 38, the braking force applied by the hydraulic brakes that are operated by the hydraulic pressure in the wheel cylinders 36, 38 is referred to as the upstream hydraulic braking force. In the present embodiment, the pressure-increase control valve 94 and the pressure-decrease control valve 96 are controlled such that the actual upstream hydraulic braking force Fpu becomes close to the target upstream hydraulic braking force Ftu. The actual upstream hydraulic braking force Fpu is a braking force based on an actual hydraulic pressure in the pressurizing chamber 46 detected by the master cylinder pressure sensor 210.

In the downstream hydraulic-pressure control mechanism 33, the pump device 158 is operated in a state in which the pressure-hold valves 170 are opened and the pressure-reduction valves 172 are closed, and the hydraulic pressure in the wheel cylinders 36, 38 is controlled by controlling the hydraulic pressure control valves 160.

The hydraulic pressure on the downstream side of the hydraulic pressure control valves 160 corresponds to the hydraulic pressure in the wheel cylinders 36, 38, and the hydraulic pressure on the upstream side of the hydraulic pressure control valves 160 corresponds to the hydraulic pressure in the pressurizing chambers 46, 47. By controlling the supply current to the hydraulic pressure control valves 160, the pressure difference dP between the hydraulic pressure on the upstream side and the hydraulic pressure on the downstream side is controlled, so that the hydraulic pressure in the wheel cylinders 36, 38 are made higher than the hydraulic pressure in the pressurizing chambers 46, 47.

In the present embodiment, a braking force corresponding to the pressure difference (pressure increase) dP obtained by subtracting the hydraulic pressure in the pressurizing chambers 46, 47 from the hydraulic pressure in the wheel cylinders 36, 38 is referred to as the downstream hydraulic braking force. Further, the supply current to the hydraulic pressure control valves 160 is controlled such that the actual downstream hydraulic braking force Fpd becomes close to the target downstream hydraulic braking force Ftd. The actual downstream hydraulic braking force Fpd is an actual braking force based on the pressure difference obtained by subtracting the detection value of the master cylinder pressure sensor 210 from the detection values of the wheel cylinder pressure sensors 212.

As described above, the hydraulic pressure in the wheel cylinders 36, 38 is obtained by adding the hydraulic pressure in the pressurizing chambers 46, 47 and the pressure difference dP controlled by the hydraulic pressure control valves 160. Accordingly, the braking force based on the hydraulic pressure in the wheel cylinders 36, 38 corresponds to a total of the upstream hydraulic braking force and the downstream hydraulic braking force, namely, corresponds to the hydraulic braking force. In a case where the upstream hydraulic braking force is substantially 0, the braking force based on the hydraulic pressure in the wheel cylinders 36, 38 corresponds to the downstream hydraulic braking force. In a case where the downstream hydraulic braking force is substantially 0, the braking force based on the hydraulic pressure in the wheel cylinders 36, 38 corresponds to the upstream hydraulic braking force.

$$Pw=Pm+dP\ Ftp=Ftu+Ftd\ Fpd\partial dP=Pw-Pm\ Fpu\partial Pm$$

In a case where the hydraulic pressure in the wheel cylinders 36, 38 is considered to be substantially proportional to the braking force, the pressure-increase control valve 94, the pressure-decrease control valve 96, and the hydraulic pressure control valves 160 are controlled not based on the braking force but based on the hydraulic pressure.

In this respect, detection as to whether the downstream hydraulic-pressure control mechanism 33 is in an abnormal state and detection as to whether the downstream hydraulic-pressure control mechanism 33 is in a pseudo abnormal state (both of which will be later explained in detail) may be performed not based on the braking force but based on the hydraulic pressure.

In the present description, the braking force based on the hydraulic pressure detected by the wheel cylinder pressure sensors 212 will be referred to as the actual downstream hydraulic braking force, and the braking force based on the hydraulic pressure detected by the master cylinder pressure sensor 210 will be referred to as the actual upstream hydraulic braking force. In particular, the actual downstream hydraulic braking force and the actual upstream hydraulic braking force are utilized in controlling the hydraulic braking force. In addition to the braking force based on the hydraulic pressure values detected by the wheel cylinder pressure sensors 212 and the braking force based on the hydraulic pressure value detected by the master cylinder pressure sensor 210, the braking force based on the hydraulic pressure generated by the downstream hydraulic-pressure control mechanism 33 may be generally referred to as the downstream hydraulic braking force, and the braking force based on the hydraulic pressure generated by the upstream hydraulic braking force may be generally referred to as the upstream hydraulic braking force.

Figure 11:
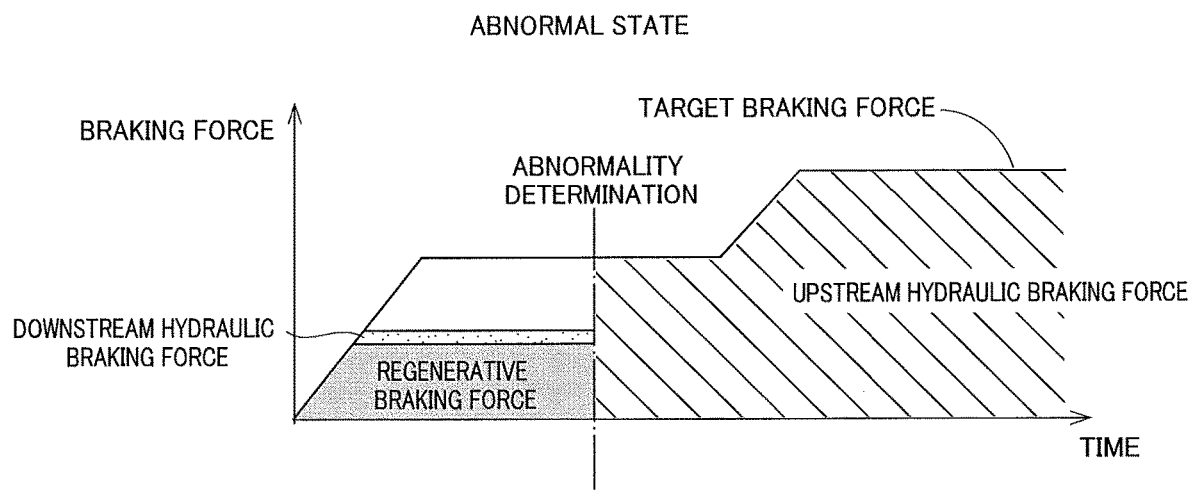
FIG. 11 is a conceptual view illustrating a state of a regenerative cooperative control in a conventional vehicle brake system when it is determined that the downstream hydraulic-pressure control mechanism is in the abnormal state.

In a conventional vehicle brake system, when the downstream hydraulic-pressure control mechanism 33 is detected to be in the abnormal state (such as when a value obtained by subtracting the hydraulic pressure in the master cylinder 43 from the hydraulic pressure in the wheel cylinders 36, 38 is greater than a set hydraulic pressure due to an abnormality or the like of the pump device 158 and when the hydraulic pressure in the wheel cylinders 36, 38 cannot be controlled due to an abnormality of the hydraulic pressure control valves 160), the regenerative braking force is made equal to 0, the downstream hydraulic-pressure control mechanism 33 stops operating, and the upstream hydraulic-pressure control mechanism 34 is operated, as illustrated in FIG. 11. The hydraulic pressure in the pressurizing chambers 46, 47 of the master cylinder 43 is controlled and supplied to the wheel cylinders 36, 38. The hydraulic pressure in the wheel cylinders 36, 38 is controlled to a pressure level corresponding to the magnitude of the upstream hydraulic braking force, and the upstream hydraulic braking force is applied to the wheels 8, 10.

In the automated driving state, in particular, it is desirable to detect with high accuracy whether the downstream hydraulic-pressure control mechanism 33 is in the abnormal state. In this respect, an arrangement is considered in which the downstream hydraulic-pressure control mechanism 33 is detected to be in the abnormal state when a wheel-cylinder hydraulic pressure Pw detected by the wheel cylinder pressure sensors 212 is lower than an abnormality determination hydraulic pressure. In such an arrangement, if a monitoring time during which the pressure detected by the wheel cylinder pressure sensors 212 is monitored is made longer, it takes a long time for detecting whether the downstream hydraulic-pressure control mechanism 33 is in the abnormal state, in other words, it takes a long time for abnormality detection. Accordingly, the braking force is insufficient for a long time while the wheel-cylinder hydraulic pressure Pw is low and the hydraulic braking force is small. In the automated driving state, the brake pedal 39 is not depressed by a driver even if the braking force is insufficient. It is thus undesirable that a state of the shortage of the braking force continue for a long time.

Figure 6:
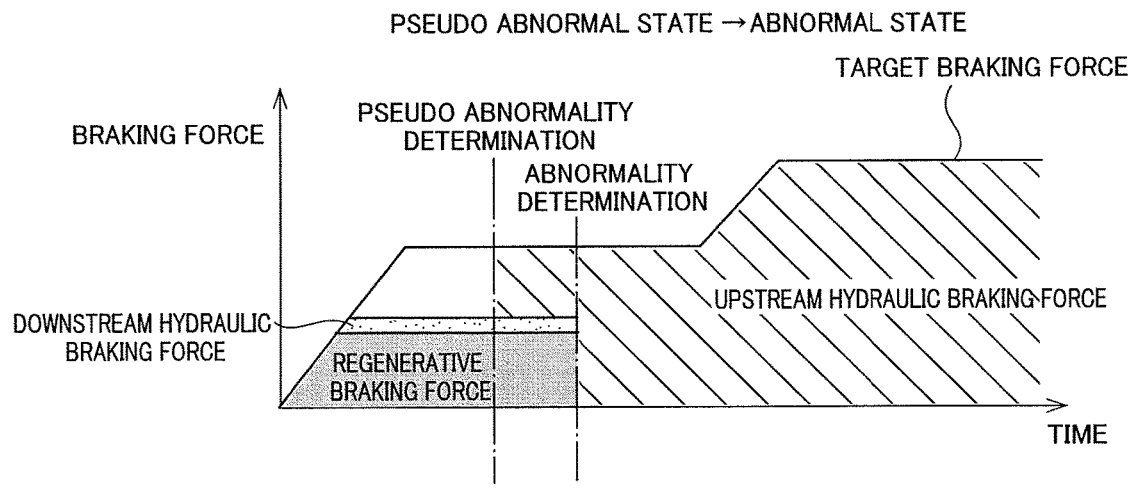
FIG. 6 is a conceptual view illustrating a state of a regenerative cooperative control in the brake system when a state of a downstream hydraulic-pressure control mechanism of the brake system is changed from a pseudo abnormal state to an abnormal state.
Figure 7:
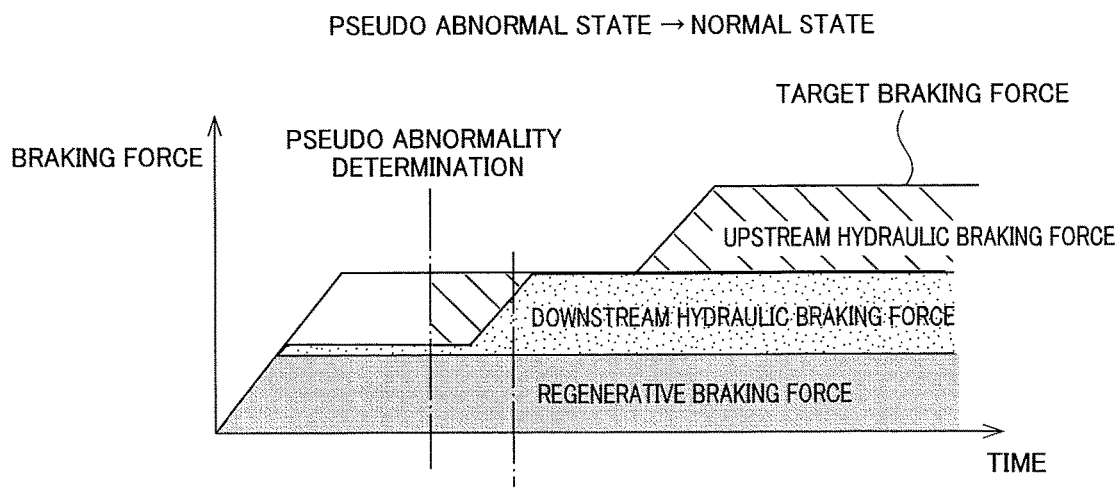
FIG. 7 is a conceptual view illustrating a state of a regenerative cooperative control in the brake system when the state of the downstream hydraulic-pressure control mechanism is changed from the pseudo abnormal state to a normal state.

In the present embodiment, therefore, there are set an abnormal state in which the downstream hydraulic-pressure control mechanism 33 is abnormal and a pseudo abnormal state in which the downstream hydraulic-pressure control mechanism 33 is suspected to be abnormal, as illustrated in FIGS. 6 and 7, and it is determined whether the downstream hydraulic-pressure control mechanism 33 is in the abnormal state and it is determined whether the downstream hydraulic-pressure control mechanism 33 is in the pseudo abnormal state. When it is detected that the downstream hydraulic-pressure control mechanism 33 is in the pseudo abnormal state, the upstream hydraulic-pressure control mechanism 34 is operated so as to apply the upstream hydraulic braking force. Accordingly, when it is detected that the downstream hydraulic-pressure control mechanism 33 is in the pseudo abnormal state, the regenerative cooperative control of the regenerative braking force, the downstream hydraulic braking force, and the upstream hydraulic braking force is executed.

Figure 8:
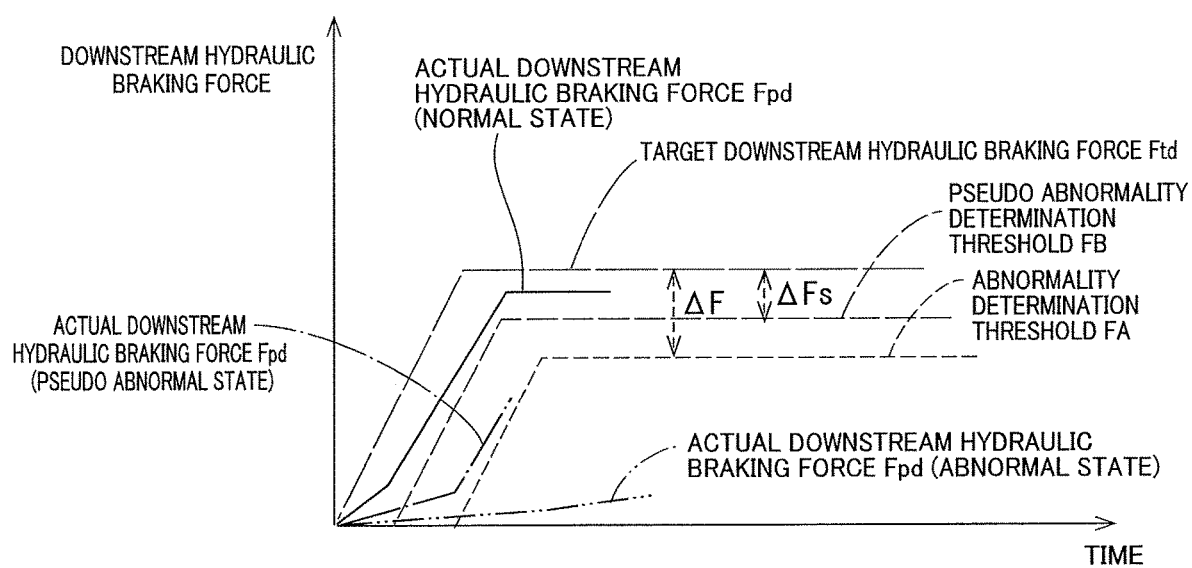
FIG. 8 is a conceptual view illustrating an abnormality determination threshold and a pseudo abnormality determination threshold utilized in the brake system.

In the present embodiment, it is determined that the downstream hydraulic-pressure control mechanism 33 is in the abnormal state when the number of times in which the actual downstream hydraulic braking force Fpd has been detected to be less than an abnormality determination threshold FA is greater than a first predetermined number N1 of times, for instance. Further, it is determined that the downstream hydraulic-pressure control mechanism 33 is in the pseudo abnormal state when the number of times in which the actual downstream hydraulic braking force Fpd has been detected to be greater than the abnormality determination threshold FA and less than a pseudo abnormality determination threshold FB that is greater than the abnormality determination threshold FA (FB>FA) is greater than a second predetermined number N2 of times. As illustrated in FIG. 8, the abnormality determination threshold FA is a value obtained by subtracting an abnormality determination deviation value ΔF from the target downstream hydraulic braking force Ftd, and the pseudo abnormality determination threshold FB is a value obtained by subtracting a pseudo abnormality determination deviation value ΔFs from the target downstream hydraulic braking force Ftd, the pseudo abnormality determination deviation value ΔFs being less than the abnormality determination deviation value ΔF. The pseudo abnormality determination threshold FB is a value greater than the abnormality determination threshold FA (FB>FA).

$$FA=Ftd-\Delta F \quad FB=Ftd-\Delta Fs$$

The abnormality determination deviation value ΔF is determined to have a magnitude that enables determination that the downstream hydraulic-pressure control mechanism 33 is in the abnormal state when the actual downstream hydraulic braking force Fpd does not reach the abnormality determination threshold FA even though the supply current to the hydraulic pressure control valves 160 is controlled in the operated state of the pump device 158 such that the actual downstream hydraulic braking force Fpd becomes close to the target downstream hydraulic braking force Ftd. Similarly, the pseudo abnormality determination deviation value ΔFs is determined to have a magnitude that enables determination that the downstream hydraulic-pressure control mechanism 33 is in the pseudo abnormal state when the actual downstream hydraulic braking force Fpd does not reach the pseudo abnormality determination threshold FB even though the supply current to the hydraulic pressure control valves 160 is controlled in the operated state of the pump device 158 such that the actual downstream hydraulic braking force Fpd becomes close to the target downstream hydraulic braking force Ftd.

The first predetermined number N1 of times may be determined to be a value that enables accurate detection of whether the downstream hydraulic-pressure control mechanism 33 is in the abnormal state. The second predetermined number N2 of times may be determined to be a value that enables accurate detection of whether the downstream hydraulic-pressure control mechanism 33 is in the pseudo abnormal state. The second predetermined number N2 of times and the first predetermined number N1 of times may be the same or may be mutually different. For instance, the second predetermined number N2 of times may be less than the first predetermined number N1 of times.

In a range in which the hydraulic pressure in the wheel cylinders 36, 38 is substantially proportional to the braking force, the detection of whether the downstream hydraulic-pressure control mechanism 33 is in the abnormal state and the detection of whether the downstream hydraulic-pressure control mechanism 33 is in the pseudo abnormal may be performed not based on the braking force but based on the hydraulic pressure in the wheel cylinders 36, 38 or the increase in the hydraulic pressure. In this instance, an abnormality determination hydraulic pressure PA corresponding to the abnormality determination threshold FA and a pseudo abnormality determination hydraulic pressure PB corresponding to the pseudo abnormality determination threshold FB (PB>PA) are determined.

Figure 3:
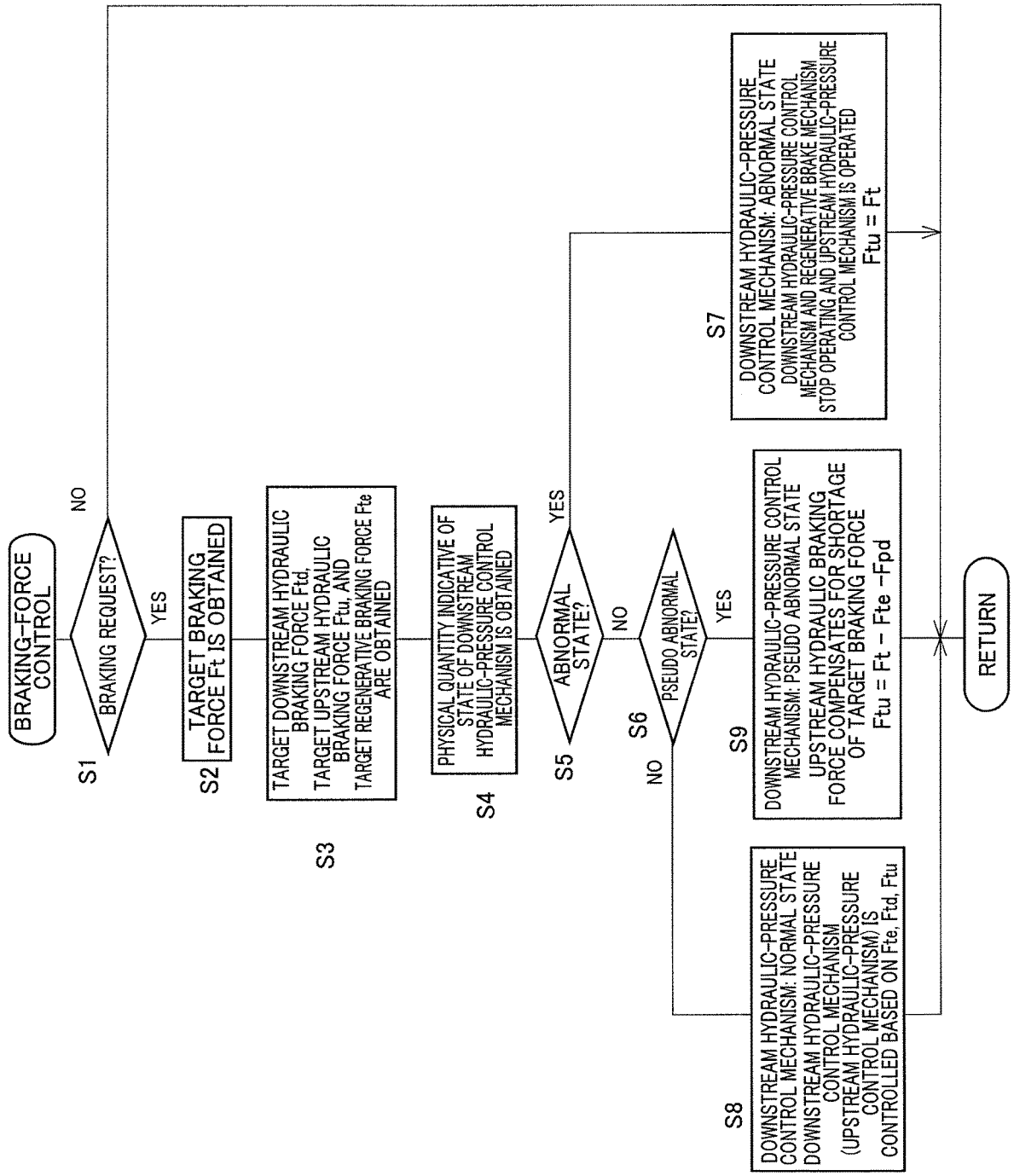
FIG. 3 is a flowchart representing a braking-force control program stored in a memory of a brake ECU of the brake system.

The brake ECU 200 stores a braking-force control program represented by a flowchart of FIG. 3. The braking-force control program is executed with a predetermined cycle time.

At Step 1, it is determined whether the braking request for the vehicle is made based on at least one the operation state of the brake pedal 39 and the information obtained by the vehicle surroundings information obtaining device 218. (Step 1 will be hereinafter abbreviated as "S1". Other steps will be similarly abbreviated.) When a negative determination (NO) is made, S2 and subsequent steps are not implemented. When an affirmative determination (YES) is made, S2 and subsequent steps are implemented.

At S2, the target braking force Ft is obtained based on at least one of the operation state of the brake pedal 39 and the information obtained by the vehicle surroundings information obtaining device 218. At S3, the target regenerative braking force Fte is obtained, the target hydraulic braking force Ftp is obtained based on a difference between the target braking force Ft and the target regenerative braking force Fte, and the target downstream hydraulic braking force Ftd and the target upstream hydraulic braking force Ftu are obtained. In a case where the target braking force Ft is less than a set value, the target upstream hydraulic braking force Ftu is determined to be 0.

The control flow proceeds to S4 to obtain information necessary for detecting whether the downstream hydraulic-pressure control mechanism 33 is in the abnormal state and detecting whether the downstream hydraulic-pressure control mechanism 33 is in the pseudo abnormal state. For instance, the necessary information includes a physical quantity indicative of a state of the downstream hydraulic-pressure control mechanism 33. The necessary information may include the abnormality determination threshold, the pseudo abnormality determination threshold, etc., to be compared with the physical quantity.

It is determined at S5 whether the downstream hydraulic-pressure control mechanism 33 is in the abnormal state and at S6 whether the downstream hydraulic-pressure control mechanism 33 is in the pseudo abnormal state, based on the information such as the physical quantity obtained at S4.

When a negative determination (NO) is made at both S5 and S6, the downstream hydraulic-pressure control mechanism 33 is detected to be in a normal state. (The normal state means a state in which the downstream hydraulic-pressure control mechanism 33 is detected to be neither in the abnormal state nor in the pseudo abnormal state. The same applies hereinafter.) For instance, the normal state corresponds to a case indicated by the solid line in FIG. 8 in which the actual downstream hydraulic braking force is greater than the pseudo abnormality determination threshold FB. At S8, the regenerative brake mechanism 30 and the hydraulic brake mechanism 32 are controlled to attain the target regenerative braking force Fte, the target upstream hydraulic braking force Ftu, and the target downstream hydraulic braking force Ftd which are obtained at S3. When the detection as to whether the downstream hydraulic-pressure control mechanism 33 is in the abnormal state and the detection as to whether the downstream hydraulic-pressure control mechanism 33 is in the pseudo abnormal state are performed, the target braking force Ft is in most cases less than the set value. Accordingly, the target upstream hydraulic braking force Ftu is 0, and the regenerative brake mechanism 30 and the downstream hydraulic-pressure control mechanism 33 are operated.

When an affirmative determination (YES) is made at S5, the downstream hydraulic-pressure control mechanism 33 is detected to be in the abnormal state. At S7, the regenerative brake mechanism 30 and the downstream hydraulic-pressure control mechanism 33 stop operating. The regenerative braking force and the downstream hydraulic braking force are determined to be 0 while the target upstream hydraulic braking force Ftu is determined to be equal to the target braking force Ft and the upstream hydraulic-pressure control mechanism 34 is operated. As illustrated by the long dashed double-short dashed line in FIG. 8, the downstream hydraulic-pressure control mechanism 33 is usually detected to be in the abnormal state after having been detected to be in the pseudo abnormal state.

When a negative determination (NO) is made at S5 and an affirmative determination (YES) is made at S6, the downstream hydraulic-pressure control mechanism 33 is detected to be in the pseudo abnormal state. For instance, the pseudo abnormal state corresponds to a case indicated by the long dashed short dashed line in FIG. 8 in which the actual downstream hydraulic braking force is less than the pseudo abnormality determination threshold FB and greater than the abnormality determination threshold FA. At S9, the regenerative cooperative control of the regenerative braking force, the upstream hydraulic braking force, and the downstream hydraulic braking force is executed. In a state in which the regenerative brake mechanism 30 is operated, the shortage of the target braking force Ft due to the small magnitude of the downstream hydraulic braking force is compensated for by the upstream hydraulic braking force.

When the downstream hydraulic-pressure control mechanism 33 is detected to be in the abnormal state after having been detected to be in the pseudo abnormal state, S7 is implemented to stop the downstream hydraulic-pressure control mechanism 33 and the regenerative brake mechanism 30 from operating, and the upstream hydraulic-pressure control mechanism 34 is controlled to increase the upstream hydraulic braking force.

When the downstream hydraulic-pressure control mechanism 33 is detected to in the normal state after having been detected to be in the pseudo abnormal state, S8 is implemented to execute the regenerative cooperative control of the downstream hydraulic braking force, the upstream hydraulic braking force, and the regenerative braking force.

One example of the processing at S4, S5, and S6 will be explained based on a flowchart of FIG. 4. A braking-force control program represented by the flowchart of FIG. 4 concretely illustrates the processing at S4, S5, and S6 in the braking-force control program represented by the flowchart of FIG. 3, and other steps S1-S3 and S7-S9 are the same as those in the flow chart of FIG. 3.

At S11, the abnormality determination threshold FA and the pseudo abnormality determination threshold FB for the actual downstream hydraulic braking force Fpd are obtained as necessary information for detecting whether the downstream hydraulic-pressure control mechanism 33 is in the abnormal state and detecting whether the downstream hydraulic-pressure control mechanism 33 is in the pseudo abnormal state. At S12, the actual downstream hydraulic braking force Fpd is obtained as the physical quantity indicative of the state of the downstream hydraulic-pressure control mechanism 33, based on the detection values of the wheel cylinder pressure sensors 212. This is because, in most cases, the hydraulic pressure in the pressurizing chambers 46, 47 is substantially equal to the atmospheric pressure, and the upstream hydraulic braking force is substantially 0. At S13, it is determined whether the actual downstream hydraulic braking force Fpd is less than the abnormality determination threshold FA. At S14, it is determined whether the actual downstream hydraulic braking force Fpd is less than the pseudo abnormality determination threshold FB.

When a negative determination (NO) is made at both S13 and S14, the downstream hydraulic-pressure control mechanism 33 is determined to be in the normal state, and S8 is executed. When an affirmative determination (YES) is made at one of S13 and S14, the number of affirmative determinations (YES) is counted at S15 or S16. At S17, it is determined whether the number n of times in which the actual downstream hydraulic braking force Fpd has been detected to be less than the abnormality determination threshold FA is greater than the first predetermined number N1 of times. When an affirmative determination (YES) is made at S17, the downstream hydraulic-pressure control mechanism 33 is detected to be in the abnormal state. At S18, it is determined whether the number k of times in which the actual downstream hydraulic braking force Fpd has been detected less the pseudo abnormality determination threshold FB is greater than the second predetermined number N2 of times. When a negative determination (NO) is made at S18, the downstream hydraulic-pressure control mechanism 33 is detected to be in the normal state. When an affirmative determination (YES) is made at S18, the downstream hydraulic-pressure control mechanism 33 is detected to be in the pseudo abnormal state. When a negative determination (NO) is made at S17, the downstream hydraulic-pressure control mechanism 33 is detected to be in the pseudo abnormal state.

Figure 4:
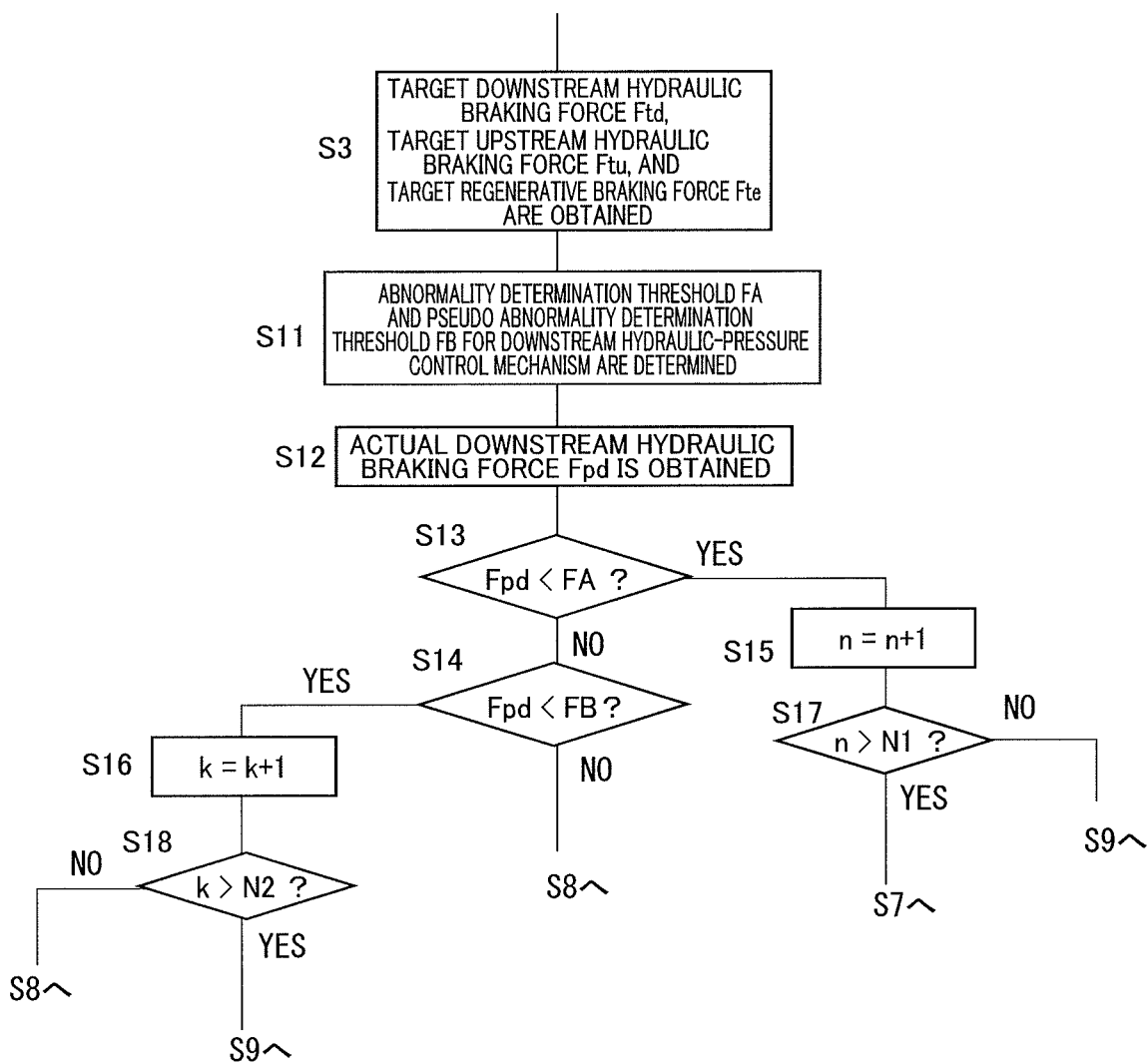
FIG. 4 is a flowchart representing part of the braking-force control program.

S11-S16, S17, and S18 in the flow chart of FIG. 4 respectively correspond to S4, S5, and S6 in the flow chart of FIG. 3. S13 and S14 in the flow chart of FIG. 4 may be considered as part of S6 in the flow chart of FIG. 3.

As described above, the brake system according to the present embodiment enables a time period during which the braking force is insufficient to be reduced more than in the conventional brake system illustrated in FIG. 11, thus preventing or reducing the shortage of the braking force.

In the present embodiment, the regenerative cooperative control of the regenerative braking force and the downstream hydraulic braking force (instead of the upstream hydraulic braking force) is executed at the start of the brake operation. The downstream hydraulic-pressure control mechanism 33 is disposed closer to the wheel cylinders 36, 38 than the upstream hydraulic-pressure control mechanism 34. Further, the response is better in the downstream hydraulic-pressure control mechanism 33 than in the upstream hydraulic-pressure control mechanism 34, thus making it possible to finely control the hydraulic pressure. Moreover, the hydraulic pressure in the wheel cylinders 36 on the front-wheel side and the hydraulic pressure in the wheel cylinders 38 on the rear-wheel side can be controlled to mutually different pressure levels, thus enabling the braking force on the front-wheel side and the braking force on the rear-wheel side to be controlled independently of each other. This configuration enables execution of appropriate control of distributing the braking force between the front wheels and the rear wheels when the regenerative cooperative control is executed. Consequently, the regenerative braking force that is outputtable can be increased in the regenerative cooperative control, resulting in an improvement in energy efficiency.

The present disclosure can be practiced both in the automated driving state of the vehicle and in the manual driving state of the vehicle. In the automated driving state, a good effect of preventing or reducing the shortage of the braking force is ensured. In the manual driving state, the driver additionally depresses the brake pedal 39 when the braking force is insufficient. Accordingly, the effect of preventing or reducing the shortage of the braking force obtained in the manual driving state is not as large as that in the automatic driving state. However, a certain degree of the effect is ensured in the manual driving state because the pseudo abnormal state is detected in the present brake system.

In the present embodiment, portions of the brake ECU 200 that store and execute the braking-force control program represented by the flowchart of FIG. 3 constitute a controller, for instance. The wheel cylinder pressure sensors 212 and portions of the brake ECU 200 that store and execute S4, S5 (S11-S13, S15, S17) constitute an abnormal-state detecting device, for instance. The wheel cylinder pressure sensors 212 and portions of the brake ECU 200 that store and execute S4, S6 (S11-S14, S16-S18) constitute a pseudo-abnormal-state detecting device, for instance. Portions of the brake ECU 200 that store and execute S9 constitute a pseudo abnormal state controller, for instance. The wheel cylinder pressure sensors 212 and portions of the brake ECU 200 that store and execute S4 (S12) constitute a first physical quantity obtaining device (first-braking-force obtaining device), for instance. The regenerative brake mechanism 30 constitutes a third-braking-force control mechanism, for instance.

The downstream hydraulic braking force corresponds to a first braking force, the upstream hydraulic braking force corresponds to a second braking force, and the regenerative braking force corresponds to a third braking force.

Instead of the downstream hydraulic-pressure control mechanism 33, the upstream hydraulic-pressure control mechanism 34 may be operated at the start of the brake operation, and the regenerative cooperative control of the regenerative braking force and the upstream hydraulic braking force may be executed.

The method of detecting whether the downstream hydraulic-pressure control mechanism 33 is in the abnormal state and whether the downstream hydraulic-pressure control mechanism 33 is in the pseudo abnormal state is not limited to the method described above. For instance, the downstream hydraulic-pressure control mechanism 33 may be detected to be in the abnormal state when a state in which the actual downstream hydraulic braking force is less than the abnormality determination threshold FA continues for a length of time longer than an abnormality determination time H1. The downstream hydraulic-pressure control mechanism 33 may be detected to be in the pseudo abnormal state when the above state continues for a length of time shorter than the abnormality determination time H1 and longer than a pseudo abnormality determination time H2 that is shorter than the abnormality determination time H1 (H2<H1).

One example of the processing at S4, S5, and S6 in such an arrangement will be explained based on a flowchart of FIG. 9. A braking-force control program represented by the flowchart of FIG. 9 concretely illustrates the processing at S4, S5, and S6 in the braking-force control program represented by the flowchart of FIG. 3, and other steps S1-S3 and S7-9 are the same as those in the flow chart of FIG. 3.

At S21, the abnormality determination threshold FA is determined by subtracting the abnormality determination deviation value ΔF from the target downstream hydraulic braking force Ftd. At S22, the actual downstream hydraulic braking force Fpd is obtained based on the detection values of the wheel cylinder pressure sensors 212. At S23, it is determined whether the actual downstream hydraulic braking force Fpd is less than the abnormality determination threshold FA. When an affirmative determination (YES) is made at S23, the control flow proceeds to S24 to measure a time length H during which the determination is affirmative (YES).

At S25, it is determined whether the time length H is greater than a predetermined abnormality determination time H1. At S26, it is determined whether the time length H is greater than the pseudo abnormality determination time H2. When an affirmative determination (YES) is made at S25, the downstream hydraulic-pressure control mechanism 33 is detected to be in the abnormal state, and S7 is implemented.

When a negative determination (NO) is made at both S25 and S26, the downstream hydraulic-pressure control mechanism 33 is detected to be in the normal state, and S8 is implemented.

When a negative determination (NO) is made at S25 and an affirmative determination (YES) is made at S26, the downstream hydraulic-pressure control mechanism 33 is detected to be in the pseudo abnormal state, and S9 is implemented.

Figure 9:
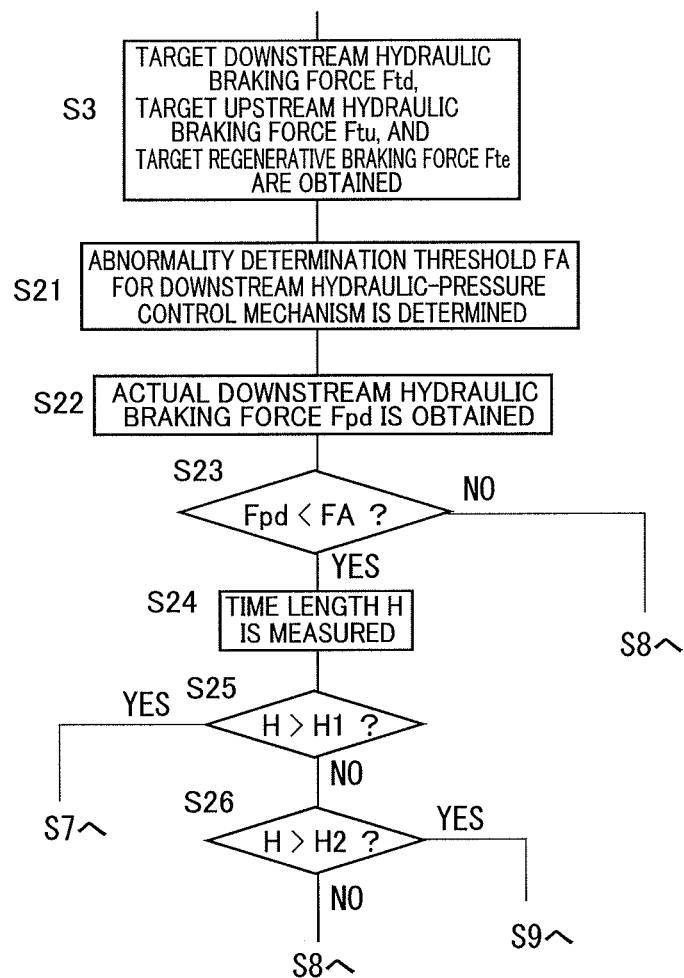
FIG. 9 is another flowchart representing part of the braking-force control program.

S21-24, S25, and S26 in the flow chart of FIG. 9 respectively correspond to S4, S5, and S6 in the flow chart of FIG. 3. S23 in the flow chart of FIG. 9 may be considered as part of S6 in the flow chart of FIG. 3.

The downstream hydraulic-pressure control mechanism 33 may be detected to be in the abnormal state when a representative value (such as an average value), which is obtained by statistically processing values of the voltage of the main battery 28 or values of the voltage applied to the pump motor 156, is lower than an abnormality determination voltage EA. The downstream hydraulic-pressure control mechanism 33 may be detected to be in the pseudo abnormal state when the representative value is higher than or equal to the abnormality determination voltage EA and lower than a pseudo abnormality determination voltage EB that is higher than the abnormality determination voltage EA (EB>EA).

One example of the processing at S4, S5, and S6 in such an arrangement will be explained based on a flowchart of FIG. 10. A braking-force control program represented by the flowchart of FIG. 10 concretely illustrates the processing at S4, S5, and S6 in the braking-force control program represented by the flowchart of FIG. 3, and other steps S1-S3 and S7-S9 are the same as those in the flow chart of FIG. 3.

At S31, the value of the application voltage E to the pump motor 156 is detected by the voltage sensor 220. At S32, a total SE of the values of the application voltage E is obtained. At S33, the number of detected values of the application voltage E (the number of samples) is counted. At S34, it is determined whether the number of samples is greater than a predetermined number N3. When an affirmative determination (YES) is made, an average value xE of the values of the application voltage E is obtained at S35. At S36, it is determined whether the average value xE is lower than the abnormality determination voltage EA. At 37, it is determined whether the average value xE is lower than the pseudo abnormality determination voltage EB.

When an affirmative determination (YES) is made at S36, the downstream hydraulic-pressure control mechanism 33 is detected to be in the abnormal state, and S7 is implemented. When a negative determination (NO) is made at both S36 and S37, the downstream hydraulic-pressure control mechanism 33 is detected to be in the normal state, and S8 is implemented. When a negative determination (NO) is made at S36 and an affirmative determination (YES) is made at S37, the downstream hydraulic-pressure control mechanism 33 is detected to be in the pseudo abnormal state, and S9 is implemented.

When the application voltage to the pump motor 156 becomes lower than the abnormality determination voltage EA after the downstream hydraulic-pressure control mechanism 33 has been detected to be in the pseudo abnormal state, the downstream hydraulic-pressure control mechanism 33 is detected to be in the abnormal state, and S7 is implemented.

Figure 10:
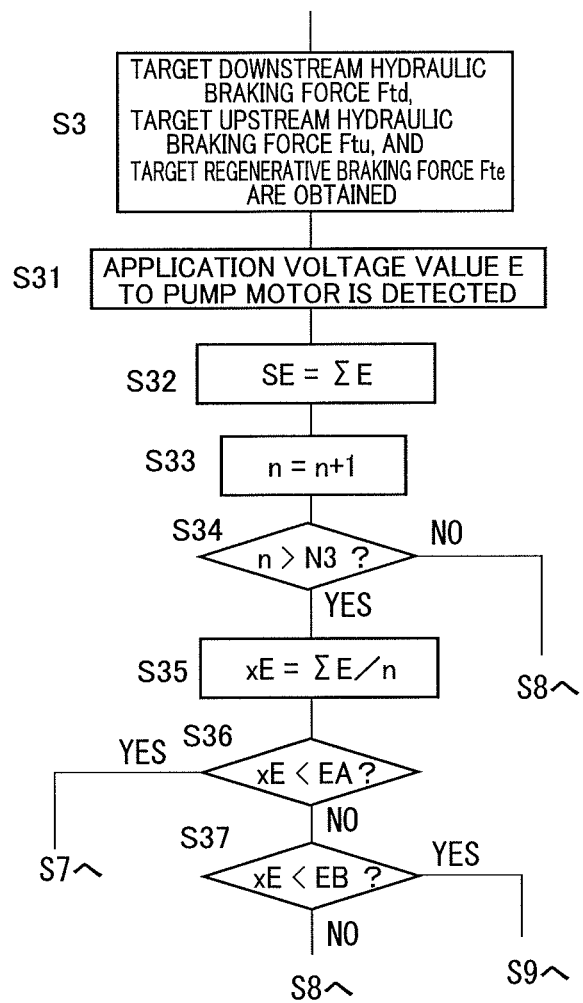
FIG. 10 is still another flowchart representing part of the braking-force control program.

S31-S35, S36, and S37 in the flow chart of FIG. 10 respectively correspond to S4, S5, and S6 in the flow chart of FIG. 3. S34 in the flow chart of FIG. 10 may be considered as part of S6 in the flow chart of FIG. 3.

The power source for the upstream hydraulic-pressure control mechanism 34 and the power source for the downstream hydraulic-pressure control mechanism 33 are different in the present embodiment. The present disclosure is not limited to this configuration. For instance, the electric power may be supplied to the upstream hydraulic-pressure control mechanism 34 and the downstream hydraulic-pressure control mechanism 33 from the same power source via respective different power supply lines.

The detection of the abnormal state and the pseudo abnormal state of the downstream hydraulic-pressure control mechanism 33 may be performed otherwise. For instance, a difference between the actual downstream hydraulic braking force Fpd and the target downstream hydraulic braking force Ftd may be obtained by a predetermined sample number or more. When a representative value (such as an average value and a median value), which is obtained by statistically processing the predetermined sample number or more of differences, is greater than the abnormality determination deviation value ΔF, the downstream hydraulic-pressure control mechanism 33 may be detected to be in the abnormal state. When the representative value is less than or equal to the abnormality determination deviation value ΔF and greater than the pseudo abnormality determination deviation value ΔFs, the downstream hydraulic-pressure control mechanism 33 may be detected to be in the pseudo abnormal state.

The present disclosure is applicable to not only Hybrid Electric Vehicles but also Battery Electric Vehicles (BEV), Fuel Cell Electric Vehicles (FCEV), and engine-powered vehicles.

It is to be understood that the present disclosure is not limited to the details of the illustrated embodiment, but may be embodied with various changes and modifications, which may occur to those skilled in the art, without departing from the spirit and the scope of the disclosure. For instance, the brake circuit may have any configuration.

CLAIMABLE INVENTION (1) A brake system for a vehicle, comprising:
  a first-braking-force control mechanism configured to control a first braking force as a braking force to be applied to the vehicle;
  a second-braking-force control mechanism configured to control a second braking force different from the first braking force, the second-braking-force control mechanism being different from the first-braking-force control mechanism;
  an abnormal-state detecting device configured to detect whether the first-braking-force control mechanism is in an abnormal state; and
  a controller configured to
    control the first-braking-force control mechanism so as to control the first braking force when the abnormal-state detecting device does not detect that the first-braking-force control mechanism is in the abnormal state, and
    control the second-braking-force control mechanism in a stopping state of the first-braking-force control mechanism so as to control the second braking force when the abnormal-state detecting device detects that the first-braking-force control mechanism is in the abnormal state,
  wherein the brake system includes a pseudo-abnormal-state detecting device configured to detect whether the first-braking-force control mechanism is in a pseudo abnormal state in which the first-braking-force control mechanism is suspected to be in the abnormal state, and
  wherein the controller includes a pseudo abnormal state controller configured to control the second-braking-force control mechanism in an operating state of the first-braking-force control mechanism so as to control the second braking force when the pseudo-abnormal-state detecting device detects that the first-braking-force control mechanism is in the pseudo abnormal state.

Both the first-braking-force control mechanism and the second-braking-force control mechanism are capable of controlling the braking force to the magnitude greater than or equal to 0. In other words, the first-braking-force control mechanism is capable of generating and controlling the first braking force. Similarly, the second-braking-force control mechanism is capable of generating and controlling the second braking force.

The abnormal state of the first-braking-force control mechanism refers to a state in which the first braking force to be applied to the vehicle is difficult to be controlled in the first-braking-force control mechanism. The abnormal state of the first-braking-force control mechanism is caused in most cases due to an abnormality of the drive source and the control system elements included in the first-braking-force control mechanism or an abnormality in which sufficient electric power is not supplied to the constituent elements of the first-braking-force control mechanism such as the drive source, for instance.

The pseudo abnormal state of the first-braking-force control mechanism refers to a state close to the abnormal state, a state that probably changes to the abnormal state in the near future, or a state in which a sign of the abnormal state appears, for instance. Specific examples of the pseudo abnormal state includes: a case in which the constituent elements such as the drive source and the control system elements are in a state close to the abnormal state; a case in which the voltage applied to the constituent elements such as the drive source is lower than a normal voltage though it is not abnormal. In a later-described configuration in which the first-braking-force control mechanism is detected to be in the abnormal state when the first braking force is less than an abnormality determination threshold, the first-braking-force control mechanism may be detected to be in the pseudo abnormal state when the first braking force is greater than or equal to the abnormality determination threshold and less than a pseudo abnormality determination threshold that is greater than the abnormality determination threshold. In another later-described configuration in which the first-braking-force control mechanism is detected to be in the abnormal state when a state in which the first braking force is less than the abnormality determination threshold continues for a length of time longer than an abnormality determination time, the first-braking-force control mechanism may be detected to be in the pseudo abnormal state when the state in which the first braking force is less than the abnormality determination threshold continues for a length of time shorter than or equal to the abnormality determination time and longer than a pseudo abnormality determination time that is shorter than the abnormality determination time.

(2) The brake system according to the form (1),
  wherein the abnormal-state detecting device detects that the first-braking-force control mechanism is in the abnormal state when the first braking force is less than an abnormality determination threshold, and
  wherein the pseudo-abnormal-state detecting device detects that the first-braking-force control mechanism is in the pseudo abnormal state when the first braking force is greater than or equal to the abnormality determination threshold and less than a pseudo abnormality determination threshold that is greater than the abnormality determination threshold.

The first-braking-force control mechanism may be detected to be in the abnormal state when a difference between the first braking force obtained by the first-braking-force obtaining device and a target first braking force is greater than an abnormality determination deviation value. The first-braking-force control mechanism may be detected to be in the pseudo abnormal state when the difference is less than or equal to the abnormality determination deviation value and greater than a pseudo abnormality determination deviation value that is less than the abnormality determination deviation value.

(3) The brake system according to the form (2), comprising a first-braking-force obtaining device configured to obtain the first braking force each time when a predetermined length of time elapses,
  wherein the abnormal-state detecting device detects that the first-braking-force control mechanism is in the abnormal state when the number of times in which the first braking force obtained by the first-braking-force obtaining device has been detected to be less than the abnormality determination threshold is greater than a first predetermined number of times, and
  wherein the pseudo-abnormal-state detecting device detects that the first-braking-force control mechanism is in the pseudo abnormal state when the number of times in which the first braking force obtained by the first-braking-force obtaining device has been detected to be greater than or equal to the abnormality determination threshold and less than the pseudo abnormality determination threshold is greater than a second predetermined number of times.

The first predetermined number of times and the second predetermined number of times may be the same or may be mutually different. For instance, the second predetermined number of times may be less than the first predetermined number of times.

Further, the predetermined length of time corresponds to the cycle time in the illustrated embodiment.

(4) The brake system according to any one of the forms (1) through (3),
- wherein the abnormal-state detecting device detects that the first-braking-force control mechanism is in the abnormal state when a state in which the first braking force is less than the abnormality determination threshold continues for a length of time longer than an abnormality determination time, and
- wherein the pseudo-abnormal-state detecting device detects that the first-braking-force control mechanism is in the pseudo abnormal state when the state in which the first braking force is less than the abnormality determination threshold continues for a length of time shorter than the abnormality determination time and longer than a pseudo abnormality determination time that is shorter than the abnormality determination time.

The abnormality determination time may be set as a time that enables the first braking force to be identified as being less than the abnormality determination threshold. The pseudo abnormality determination time may be set as a time that enables the first braking force to be identified as being less than the pseudo abnormality determination threshold.

(5) The brake system according to any one of the forms (1) through (4),
- wherein the abnormal-state detecting device detects that the first-braking-force control mechanism is in the abnormal state when an application voltage applied from a power source to a drive source of the first-braking-force control mechanism is lower than an abnormality determination voltage, and
- wherein the pseudo-abnormal-state detecting device detects that the first-braking-force control mechanism is in the pseudo abnormal state when the application voltage applied from the power source to the drive source of the first-braking-force control mechanism is higher than or equal to the abnormality determination voltage and lower than a pseudo abnormality determination voltage that is higher than the abnormality determination voltage.

The voltage of the power source that supplies the electric power to the drive source may be detected. Based on the detected voltage of the power source, the detection of whether the first-braking-force control mechanism is in the abnormal state and the detection of whether the first-braking-force control mechanism is in the pseudo abnormal state may be performed.

(6) The brake system according to any one of the forms (1) through (5), comprising a first physical quantity obtaining device configured to obtain a first physical quantity each time when a predetermined length of time elapses, the first physical quantity being a physical quantity indicative of a state of the first-braking-force control mechanism.

The first physical quantity may be the first braking force, the application voltage to the drive source, or the like.

(7) The brake system according to the form (6), wherein, after the first physical quantity obtaining device has obtained a predetermined number or more of first physical quantities, the abnormal-state detecting device detects whether the first-braking-force control mechanism is in the abnormal state based on the predetermined number or more of first physical quantities.

Each of the above forms (3)-(5) is one example of the form (7).

The detection of whether the first-braking-force control mechanism is in the abnormal state may be performed based on a representative value (such as an average value or a median value) obtained by statistically processing a predetermined number or more of first braking force values, for instance. The predetermined number of first physical quantities may be a first predetermined number and a second predetermined number that respectively correspond to the first predetermined number of times and the second predetermined number of times or may be a third predetermine number that corresponds to a third predetermined number different from the first predetermined number and the second predetermined number. Further, the predetermined number of first physical quantities may be determined such that a time, which is obtained by multiplying the predetermined number of first physical quantities by the predetermined length of time (cycle time), is equal to the abnormality determination time and the pseudo abnormality determination time.

(8) The brake system according to any one of the forms (1) through (7), comprising a first-braking-force obtaining device configured to obtain the first braking force each time when a predetermined length of time elapses,
- wherein the abnormal-state detecting device detects that the first-braking-force control mechanism is in the abnormal state when a representative value is greater than an abnormality determination deviation value, the representative value being obtained by statistically processing a plurality of differences each of which is a difference between the first braking force obtained by the first-braking-force obtaining device and a target first braking force, and
- wherein the pseudo-abnormal-state detecting device detects that the first-braking-force control mechanism is in the pseudo abnormal state when the statistically processed value is less than or equal to the abnormality determination deviation value and greater than a pseudo abnormality determination deviation value that is less than the abnormality determination deviation value.

(9) The brake system according to any one of the forms (1) through (8),
- wherein the first-braking-force control mechanism includes a first drive source that is a drive source by which the first-braking-force control mechanism is activated,
- wherein the second-braking-force control mechanism includes a second drive source that is a drive source by which the second-braking-force control mechanism is activated, and
- wherein the brake system includes a first power source that supplies an electric power to the first drive source and a second power source that is different from the first power source and that supplies an electric power to the second drive source.

The electric power may be supplied to the first drive source and the second drive source from the same power source via respective different power supply lines. The first drive source and the second drive source respectively correspond to the pump motor 156 and the pump motor 88 in the illustrated embodiment. The first power source and the second power source respectively correspond to the main battery 28 and the sub battery 35 in the illustrated embodiment.

(10) The brake system according to any one of the forms (1) through (9), comprising a third-braking-force control mechanism configured to control a third braking force different from the first braking force and the second braking force, the third-braking-force control mechanism being different from the first-braking-force control mechanism and the second-braking-force control mechanism,
  wherein the controller is configured to:
    execute a cooperative control of the third braking force and the first braking force when the abnormal-state detecting device does not detect that the first-braking-force control mechanism is in the abnormal state; and
    control the second-braking-force control mechanism in a stopping state of the first-braking-force control mechanism and the third-braking-force control mechanism so as to control the second braking force when the abnormal-state detecting device detects that the first-braking-force control mechanism is in the abnormal state, and
  wherein the pseudo abnormal state controller is configured to execute a cooperative control of the first braking force, the third braking force, and the second braking force when the pseudo-abnormal-state detecting device detects that the first-braking-force control mechanism is in the pseudo abnormal state.

(11) The brake system according to the form (10),
  wherein the vehicle includes an electric motor as a drive source, and
  wherein the third-braking-force control mechanism is a regenerative brake mechanism configured to apply the braking force to a plurality of drive wheels of the vehicle by regenerative braking of the electric motor.

(12) The brake system according to any one of the forms (1) through (11), comprising a plurality of hydraulic brakes provided respectively for a plurality of wheels of the vehicle and configured to be operated by a hydraulic pressure,
  wherein the first-braking-force control mechanism is a first-hydraulic-pressure control mechanism configured to control a hydraulic pressure that the first-hydraulic-pressure control mechanism supplies to the plurality of hydraulic brakes,
  wherein the second-braking-force control mechanism is a second-hydraulic-pressure control mechanism configured to control a hydraulic pressure that the second-hydraulic-pressure control mechanism supplies to the plurality of hydraulic brakes, and
  wherein the first-hydraulic-pressure control mechanism is disposed downstream of the second-hydraulic-pressure control mechanism.

The first-hydraulic-pressure control mechanism may be configured to be capable of generating and controlling the hydraulic pressure. The second-hydraulic-pressure control mechanism may be configured to be capable of generating and controlling the hydraulic pressure. The first-hydraulic-pressure control mechanism and the second-hydraulic-pressure control mechanism may be referred to as a downstream hydraulic-pressure control mechanism and an upstream hydraulic-pressure control mechanism, respectively.

(13) The brake system according to the form (12), wherein the first-hydraulic-pressure control mechanism includes: a pump device disposed between the second-hydraulic-pressure control mechanism and wheel cylinders of the plurality of hydraulic brakes and configured to pump up and pressurize a working fluid and to supply the pressurized working fluid to the wheel cylinders; and hydraulic pressure control valves configured to control a hydraulic pressure in the wheel cylinders utilizing a hydraulic pressure of the working fluid ejected from the pump device.

(14) The brake system according to the form (12) or (13),
  wherein the second-hydraulic-pressure control mechanism includes a master cylinder including a pressurizing piston and a rear-hydraulic-pressure control device configured to control a hydraulic pressure in a rear chamber provided rearward of the pressurizing piston, and
  wherein the rear-hydraulic-pressure control device is configured to supply a hydraulic pressure to the rear chamber to cause the pressurizing piston to move forward and to thereby control a hydraulic pressure in a pressurizing chamber provided frontward of the pressurizing piston.

The first-hydraulic-pressure control mechanism is better in response than the second-hydraulic-pressure control mechanism and is capable of controlling the hydraulic pressure more finely. Thus, the hydraulic braking force can be finely controlled with high response by operating the first-hydraulic-pressure control mechanism at the start of the brake operation.

(15) A brake system for a vehicle, comprising:
  a first-braking-force control mechanism configured to control a first braking force as a braking force to be applied to the vehicle;
  a second-braking-force control mechanism configured to control a second braking force different from the first braking force, the second-braking-force control mechanism being different from the first-braking-force control mechanism;
  a first-abnormal-state detecting device configured to detect whether the first-braking-force control mechanism is in a first abnormal state as an abnormal state; and
  a controller configured to
    control the first-braking-force control mechanism so as to control the first braking force when the first-abnormal-state detecting device does not detect that the first-braking-force control mechanism in the first abnormal state, and
    control the second-braking-force control mechanism in a stopping state of the first-braking-force control mechanism so as to control the second braking force when the first-abnormal-state detecting device detects that the first-braking-force control mechanism is in the first abnormal state,
  wherein the brake system includes a second-abnormal-state detecting device configured to detect whether the first-braking-force control mechanism is in a second abnormal state that is an abnormal state different from the first abnormal state, and
  wherein the controller includes a second-abnormal-state controller configured to control the second-braking-force control mechanism in an operating state of the first-braking-force control mechanism so as to control the second braking force when the second-abnormal-state detecting device detects that the first-braking-force control mechanism is in the second abnormal state.

The brake system according to this form may employ the technical features described in the forms (1)-(14). The abnormal state and the pseudo abnormal state described in the forms (1)-(14) respectively correspond to the first abnormal state and the second abnormal state. Likewise, the abnormal-state detecting device and the pseudo-abnormal-state detecting device described in the forms (1)-(14) respectively correspond to the first-abnormal-state detecting device and the second-abnormal-state detecting device.

What is claimed is:

1. A brake system for a vehicle, comprising:
a first-braking-force control mechanism configured to control a first braking force as a braking force to be applied to the vehicle;
a second-braking-force control mechanism configured to control a second braking force different from the first braking force, the second-braking-force control mechanism being different from the first-braking-force control mechanism;
a third-braking-force control mechanism configured to control a third braking force different from the first braking force and the second braking force, the third-braking-force control mechanism being different from the first-braking-force control mechanism and the second-braking-force control mechanism;
an abnormal-state detecting device configured to detect whether the first-braking-force control mechanism is in an abnormal state;
a controller configured to:
control the first-braking-force control mechanism so as to control the first braking force when the abnormal-state detecting device does not detect that the first-braking-force control mechanism is in the abnormal state, and
control the second-braking-force control mechanism in a stopping state of the first-braking-force control mechanism so as to control the second braking force when the abnormal-state detecting device detects that the first-braking-force control mechanism is in the abnormal state,
execute a cooperative control of the third braking force and the first braking force when the abnormal-state detecting device does not detect that the first-braking-force control mechanism is in the abnormal state, and
control the second-braking-force control mechanism in a stopping state of the first-braking-force control mechanism and the third-braking-force control mechanism so as to control the second braking force when the abnormal-state detecting device detects that the first-braking-force control mechanism is in the abnormal state; and
a pseudo-abnormal-state detecting device configured to detect whether the first-braking-force control mechanism is in a pseudo abnormal state in which the first-braking-force control mechanism is suspected to be in the abnormal state,
wherein the controller includes a pseudo abnormal state controller configured to:
control the second-braking-force control mechanism in an operating state of the first-braking-force control mechanism so as to control the second braking force when the pseudo-abnormal-state detecting device detects that the first-braking-force control mechanism is in the pseudo abnormal state, and
execute a cooperative control of the first braking force, the third braking force, and the second braking force when the pseudo-abnormal-state detecting device detects that the first-braking-force control mechanism is in the pseudo abnormal state.

2. The brake system according to claim 1,
wherein the abnormal-state detecting device detects that the first-braking-force control mechanism is in the abnormal state when the first braking force is less than an abnormality determination threshold, and
wherein the pseudo-abnormal-state detecting device detects that the first-braking-force control mechanism is in the pseudo abnormal state when the first braking force is greater than or equal to the abnormality determination threshold and less than a pseudo abnormality determination threshold that is greater than the abnormality determination threshold.

3. The brake system according to claim 1,
wherein the abnormal-state detecting device detects that the first-braking-force control mechanism is in the abnormal state when an application voltage applied from a power source to a drive source of the first-braking-force control mechanism is lower than an abnormality determination voltage, and
wherein the pseudo-abnormal-state detecting device detects that the first-braking-force control mechanism is in the pseudo abnormal state when the application voltage applied from the power source to the drive source of the first-braking-force control mechanism is higher than or equal to the abnormality determination voltage and lower than a pseudo abnormality determination voltage that is higher than the abnormality determination voltage.

4. The brake system according to claim 1, comprising a first physical quantity obtaining device configured to obtain a first physical quantity each time when a predetermined length of time elapses, the first physical quantity being a physical quantity indicative of a state of the first-braking-force control mechanism,
wherein, after the first physical quantity obtaining device has obtained a predetermined number or more of first physical quantities, the abnormal-state detecting device detects whether the first-braking-force control mechanism is in the abnormal state based on the predetermined number or more of first physical quantities.

5. The brake system according to claim 1, comprising a plurality of hydraulic brakes provided respectively for a plurality of wheels of the vehicle and configured to be operated by a hydraulic pressure,
wherein the first-braking-force control mechanism is a first-hydraulic-pressure control mechanism configured to control a hydraulic pressure that the first-hydraulic-pressure control mechanism supplies to the plurality of hydraulic brakes,
wherein the second-braking-force control mechanism is a second-hydraulic-pressure control mechanism configured to control a hydraulic pressure that the second-hydraulic-pressure control mechanism supplies to the plurality of hydraulic brakes, and
wherein the first-hydraulic-pressure control mechanism is disposed downstream of the second-hydraulic-pressure control mechanism.

* * * * *